Patented Sept. 5, 1922.

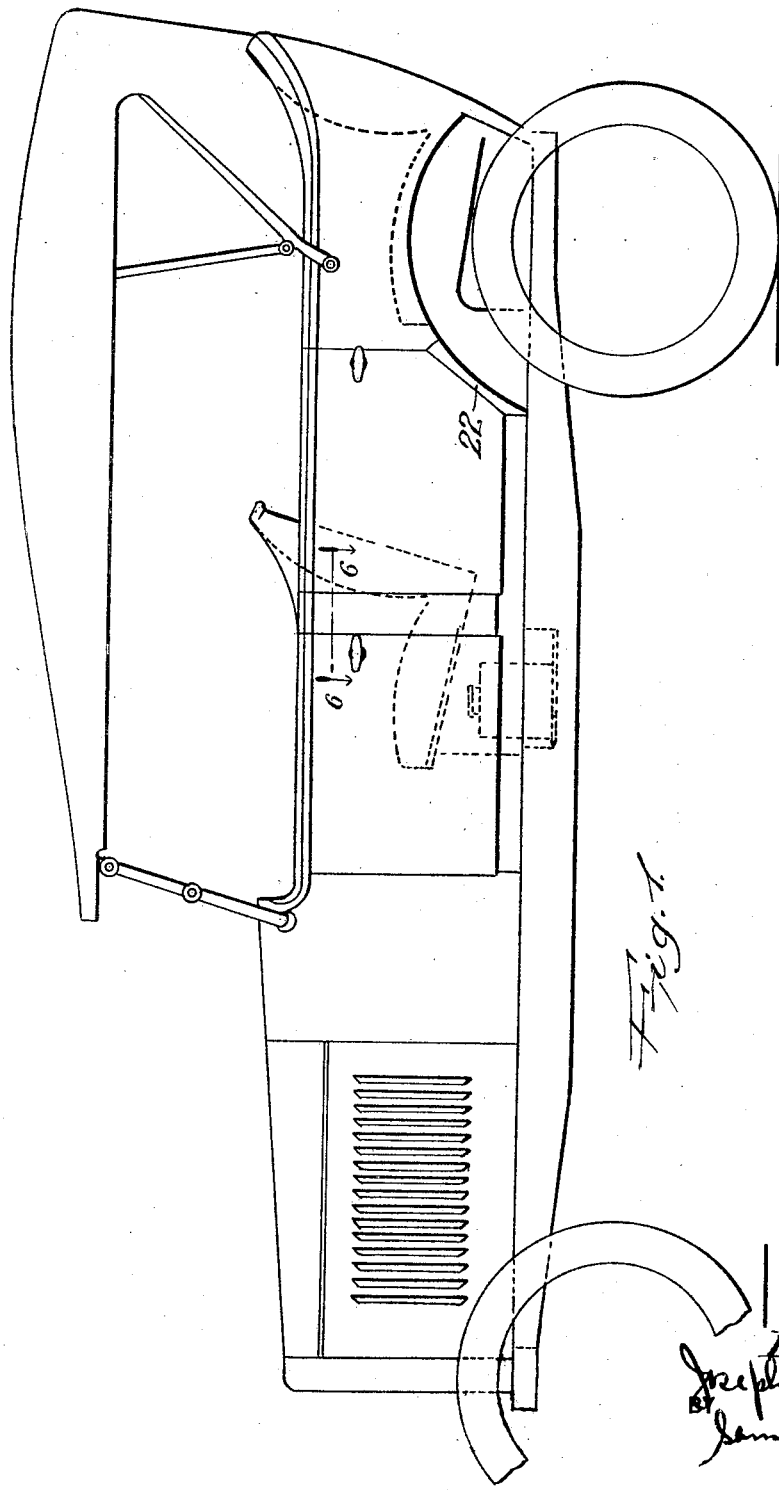

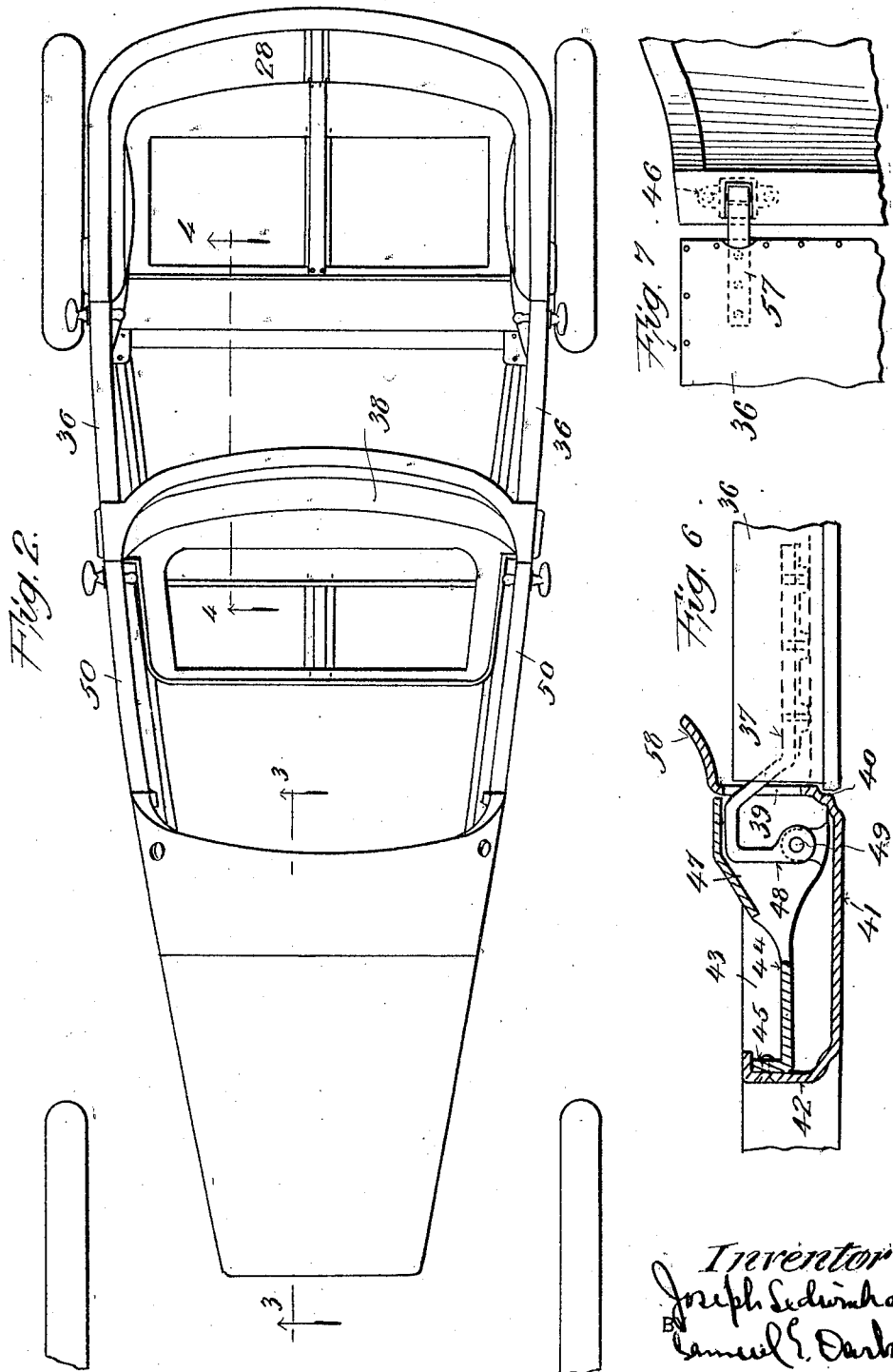

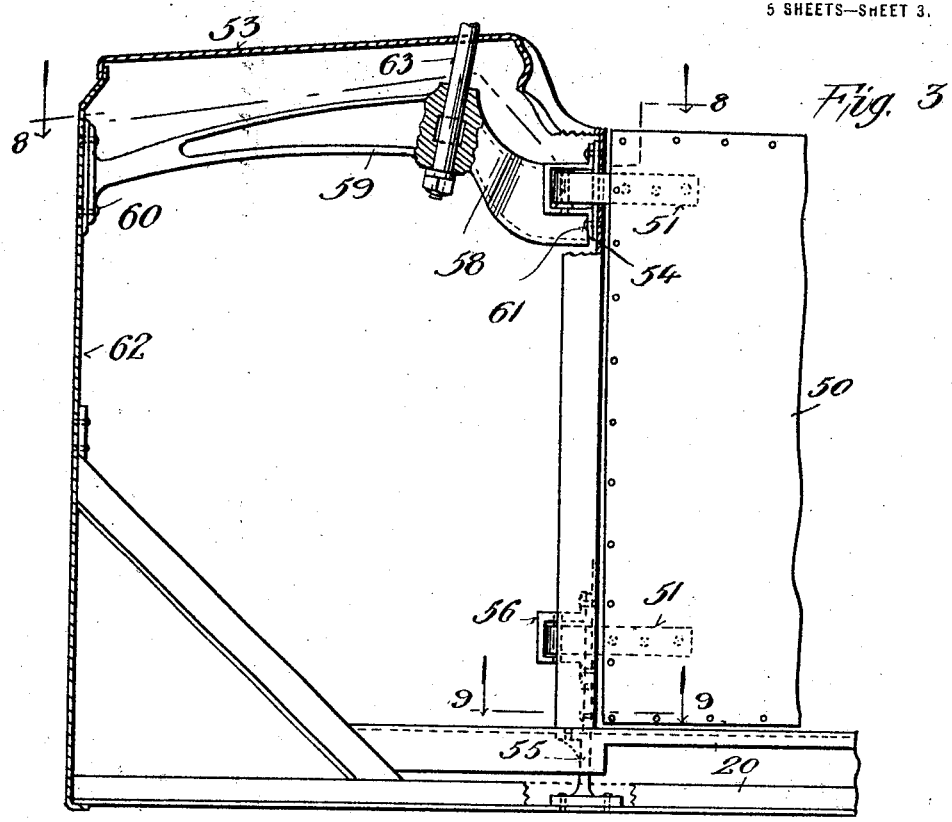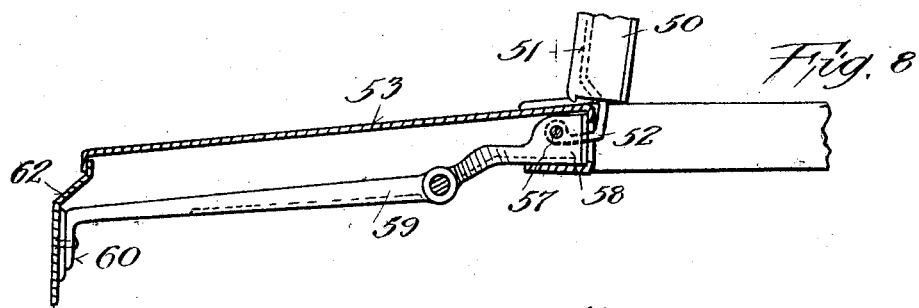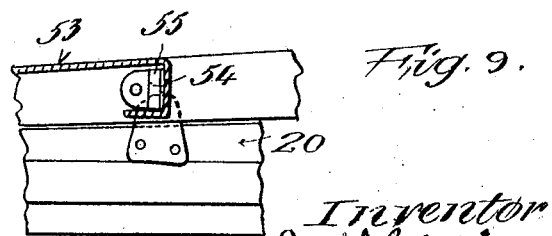

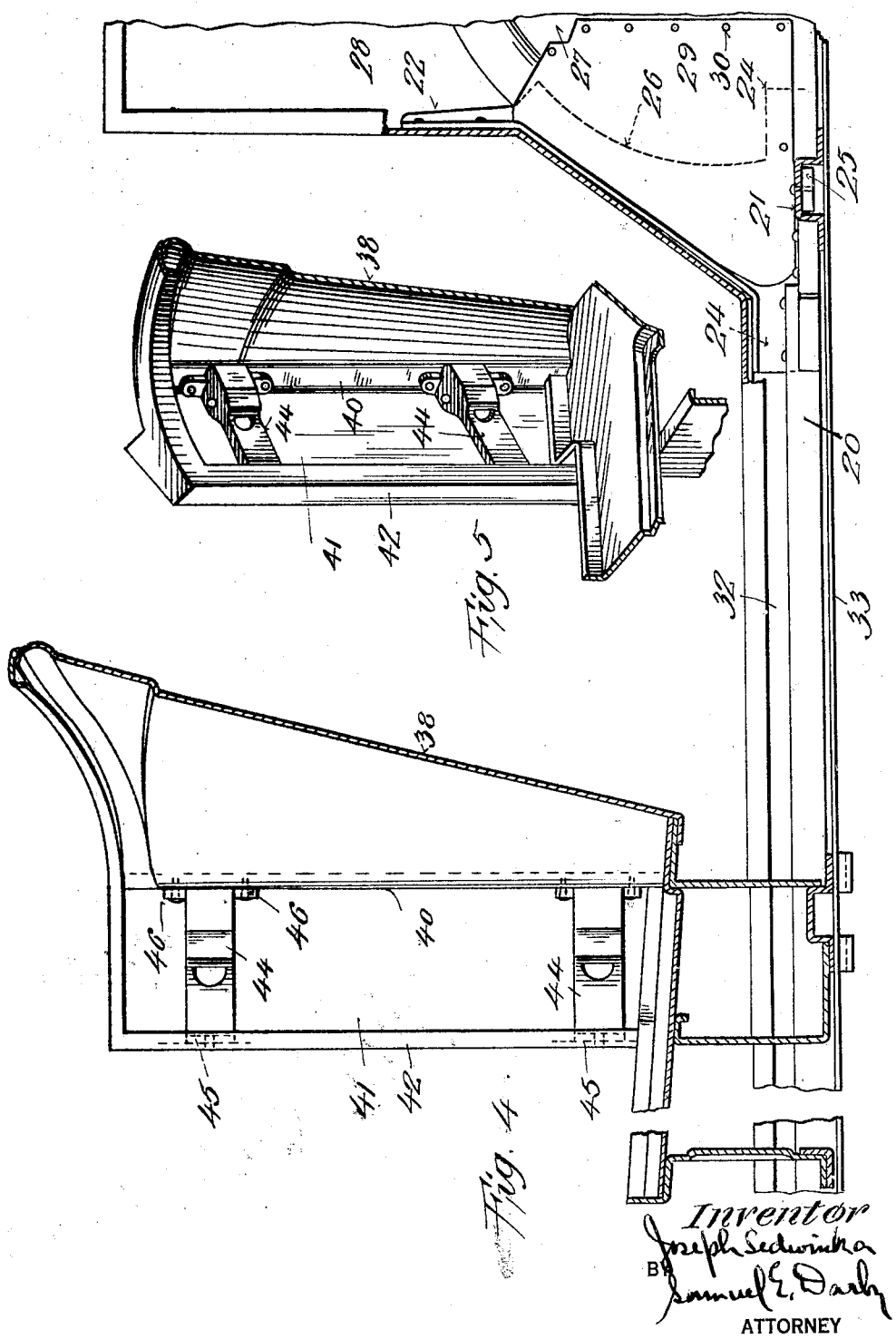

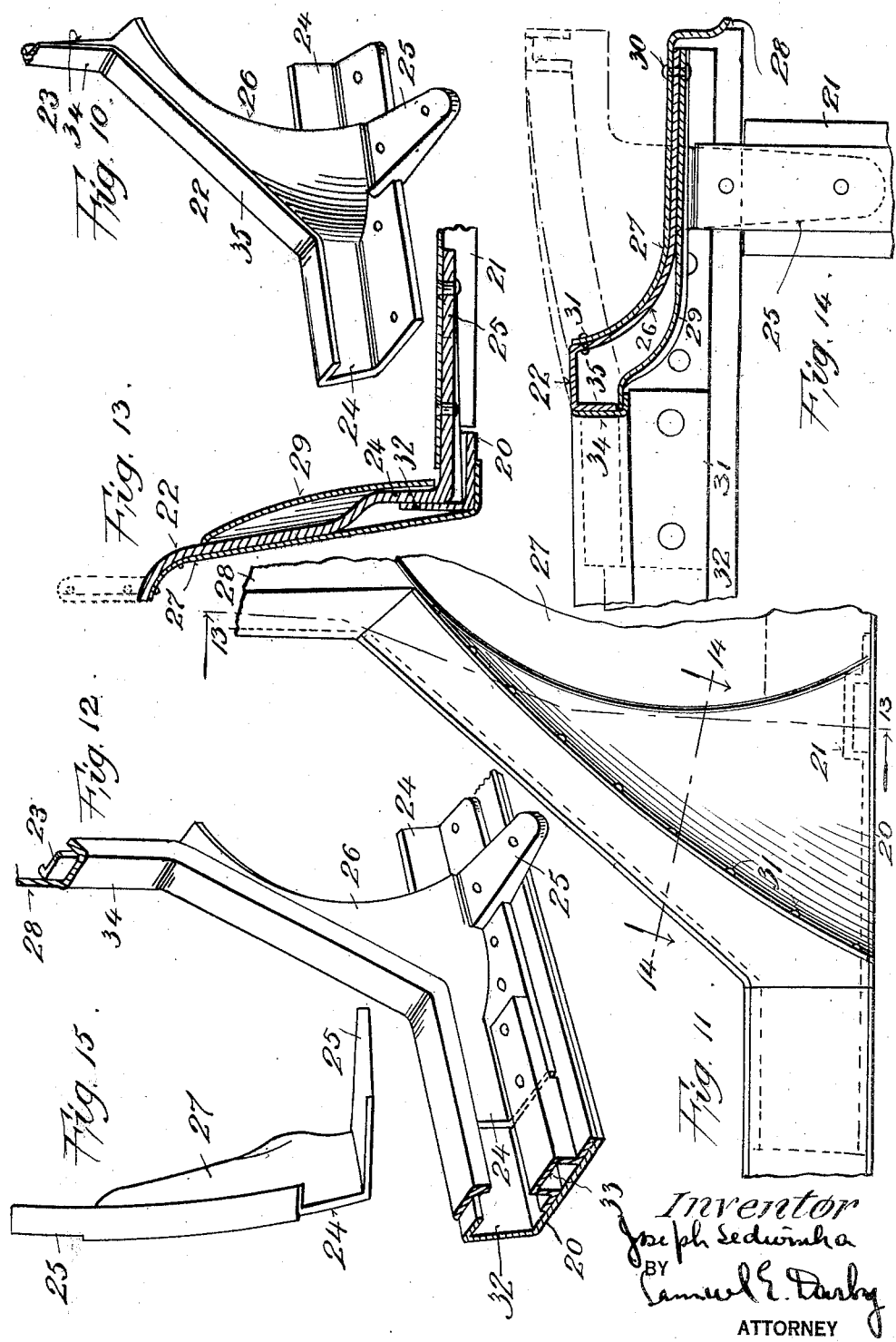

1,428,105

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

AUTOMOBILE BODY STRUCTURE.

Application filed January 19, 1920. Serial No. 352,277.

*To all whom it may concern:*

Be it known that I, JOSEPH LEDWINKA, a citizen of the United States, residing at Philadelphia, county of Philadelphia, State of Pennsylvania, have made a certain new and useful Invention in Automobile Body Structures, of which the following is a specification.

This invention relates to automobile body structures.

The object of the invention is to provide a metal body structure for automobiles which is simple, economical to manufacture and strong and sturdy in use.

A further object is to provide an efficient post structure for automobile bodies, which affords strength and rigidity to the body and enables the same to resist the effects of strains and stresses imposed on the body, and which, when applied as a part of the door post structure, receives and resists the shocks and jars of the door slams.

A further object is to provide a reinforced hinge supporting structure for the doors of automobile bodies.

A further object is to provide a windshield bracket structure for automobile bodies, which reinforces and stiffens the cowl panel of the body, while, at the same time, affording a support for the windshield.

Other objects of the invention will appear more fully hereinafter.

The invention consists substantially in the construction, combination, location, and relative arrangement of parts, all as will be more fully hereinafter set forth, as shown in the accompanying drawings, and finally pointed out in the appended claims.

Referring to the drawings—

Fig. 1 is a view in side elevation of an automobile having a body structure embodying the principles of my invention.

Fig. 2 is a top plan view of the same, the top or canopy being removed.

Fig. 3 is a view in vertical longitudinal section of the cowl portion of the body, on the line 3, 3, Fig. 2, looking in the direction of the arrows, and showing the structure and disposition of the windshield bracket.

Fig. 4 is a view similar to Fig. 3, on the line 4, 4, Fig. 2, looking in the direction of the arrows, and showing the bracket for reinforcing the rear door post structure.

Fig. 5 is a detail view in perspective, parts in vertical section, of the inner portion of one end of the front seat panel showing the hinge supports for the rear door.

Fig. 6 is a broken detail view in horizontal section on the line 6, 6, Fig. 1, looking in the direction of the arrows, showing a hinge support for the rear door, the latter occupying its closed position.

Fig. 7 is a similar view in elevation of the same with the door in its open position.

Fig. 8 is a broken detail view in horizontal section, on the line 8, 8, Fig. 3, looking in the direction of the arrows.

Fig. 9 is a similar view in section on the line 9, 9, Fig. 3, looking in the direction of the arrows.

Fig. 10 is a detached detail view in perspective of the rear door post reinforcing bracket.

Fig. 11 is a broken view in outside elevation showing the application of the bracket shown in Fig. 10 to the body panels and associated parts.

Fig. 12 is a broken view in perspective, showing from the inner side the application of the rear door post reinforcing bracket.

Fig. 13 is a broken view in vertical section on the line 13, 13, Fig. 11, looking in the direction of the arrows.

Fig. 14 is a similar view in horizontal section on the line 14, 14, Fig. 11, looking in the direction of the arrows.

Fig. 15 is a detached detail broken view in end elevation of the portion of the tonneau panel which is applied to the reinforcing door post bracket shown in Figs. 10 and 12.

The same part is designated by the same reference numeral wherever it occurs throughout the several views.

In the manufacture of steel bodies for automobiles it is desirable to avoid the use of unnecessary structural parts in order to reduce the weight as well as the cost of manufacture thereof, while at the same time it is necessary to provide a strong rugged structure capable of withstanding and resisting the stresses and strains imposed thereon in the use of the car. The greatest weakness in all steel bodies sometimes occurs at the door post and door hinge supporting structures because of the rough usage, shocks and jars to which such structures are subjected. Severe strains and stresses are also imposed on the windshield supports due to the vibrations imparted to the body especially when passing over rough places, cobble stones, street car tracks, and other unevennesses in the road surface traversed by the car.

It is among the special purposes of my present invention to provide a structure of automobile body which combines reinforcing members at the points where weakness is likely to develop with the parts composing the body to secure strength, rigidity and ruggedness at such points while at the same time reducing the number of parts required, and hence simplifying the structure and securing a minimum of weight and cost of construction with increased strength and life of the body.

I will first describe the post structure at the front vertical edge of the tonneau panel, which forms a reinforcement for such panel and an efficient means for securing the same to the longitudinal and cross members of the body frame, and which receives the shocks of the door slams in closing the rear door. In this connection particular reference is made to the structure illustrated in Figs. 4, 10, 11, 12, 13, 14 and 15, wherein 20 designates the longitudinally extending body side frame member or sill. This frame member may be of any suitable or desirable shape or form. As shown, at the vicinity of the door post, it is of channel shape. It will be understood, of course, that a corresponding body frame member or sill is disposed at each side of the body. The body side frame members 20 are suitably connected together by transversely disposed frame members, one of which is shown at 21, and which, in this instance, is shown as of channel shape in cross section, though my invention is not to be limited or restricted in this respect.

Reference numeral 22, Fig. 10, designates generally a casting or stamping which is formed with the vertically extending portion 23, the portion 24, which extends longitudinally of the body, and the portion 25, which extends in a direction transversely of the body. The part 26 of the vertical portion of the member 22 is depressed or curved inwardly, as most clearly shown in Fig. 14, and the vertical portion 27 of the forward portion of the tonneau panel 28 is correspondingly pressed or curved inwardly and is applied to the exterior inwardly pressed or curved surface 26. The resulting depression thus formed in the outer surface of the body constitutes the rear wheel housing of the body.

The longitudinally extending portions 24 of the member 22 may be of any suitable or desirable shape or form. The portion thereof which extends towards the front end of the body is shown as of channel shape in cross section, while the rearwardly extending portion is shown as of angle shape I do not desire, however, to be limited or restricted in these respects. The portions 24 of the members 22 are secured by welding, riveting or otherwise to the longitudinal body sills 20, to which said portions 24 are applied and fitted. The transversely extending portions 25 of the members 22 are secured to the transverse body frame members 21. If desired, a sheet steel stamping or plate 29 is applied over the inner surface of the member 22, and at 30, the member 22, the vertical forward portion, 27, of the tonneau panel, 28, and the stamping, 29, are all secured together. The vertical edge of the panel, 28, is secured to the member, 22, as at 31. The body side panel, 32, is provided with a lower longitudinal inwardly-extending flange, 33, to which the channel shaped stamping, 20, forming the body sill, is applied. The rear end of this body sill is secured to a longitudinally-extending portion of the member, 22, and the body sill forms a reinforcement at the door opening. A stamping, 34, in the form of an angle strip, is applied over the forwardly-presenting edge, 35, of the member, 22, and constitutes a finish and reinforcing strip for the rear doorway of the body.

A structure such as above described is not only strong and rugged and capable of efficiently resisting and withstanding the stresses and strains imposed on the body when in use, and also of taking the shocks and jars of the door slams, but it is a simple structure, easily manufactured and assembled, and dispenses with the complicated, heavy and expensive post structures heretofore employed.

It will be understood, of course, that a reinforcing member 22 may likewise be applied at any desired point in the body structure to secure strength and rigidity of such structure.

I will now describe a structure of door hinge supports embodying my invention, and particularly the hinge structure for the rear door, reference being had to Figs. 4, 5, 6 and 7.

Extending through the edge wall of the door 36 are the shanks of the hinge straps 37, which are suitably secured to the door. These hinge straps pass through openings 39 in the side portions of the front seat panel 38. These side portions are bent outwardly, as at 40, and then forwardly, as at 41, and the front vertical edge thereof is flanged inwardly, as at 42, thereby forming an open sided box or chamber 43. Disposed in this chamber are stampings or members 44, formed at one end with a lateral flange 45, which is fitted against and secured to the inner surface of the lateral flange 42 of the front seat panel 38. At its other end each member 44 is formed with feet 46, which fit against and are secured to the inner surface of the outwardly bent portions 40 of the panel 38. The stampings or members 44 are formed with enlarged portions 47 adjacent the feet 46, in which are received the angle portions 48 of the hinge straps 37, and which angle portions receive the hinge pins 49 which are mounted in the enlarged portions 47 of the members 44. This structure not only affords a strong, rugged and simple hinge supporting device for the doors, but the members 44 also form braces or bracing struts for the channels or chambers 43, which enable the same to constitute door posts to support the rear doors and to receive the slams of the front doors 50 in closing the same.

I will now describe the hinge structure for supporting the front doors, attention being called to Figs. 3, 8 and 9.

Each door is provided with a hinge strap 51. The angle portion 52 of the lowermost one of the straps 51 extends through an opening in the inturned flange 54 forming the vertical edge portion of the dash or cowl panel 53 of the body. This inturned flange portion 54 forms, in effect, a vertical reinforcing channel. A standard 55 is secured at its base to the longitudinal body sill 20, and is provided with a vertical portion which extends up and against and is secured to the cowl flange 54. A strap bracket 56 is secured to the standard 55, and carries the hinge pin on which is received the angle portion of the lower hinge strap 51. The upper hinge strap or the angle portion 52 thereof is received upon a pivot pin 57, mounted in an enlarged head portion 58 of a bracket 59, which constitutes a combined hinge and windshield standard support. This bracket 59 is formed with feet 60, 61, at the respective ends thereof. The foot 60 fits against and is secured to the front vertical panel 62 of the dash or cowl, while the foot 61 fits against and is secured to the inturned flange 54 of the panel 53 at its rear edge. The windshield standard 63 is carried by the bracket 59, and hence said bracket not only serves as a brace or reinforcing strut for the cowl panel, but it also performs the functions of a windshield standard support and a hinge support for the upper hinge of the front door.

Certain features disclosed in this application and not claimed herein, are disclosed in claims in my copending application for Letters Patent for steel bodies for automobiles, Serial No. 336,059, filed November 6, 1919, to which cross-reference is hereby made. Some of the claims of said application are broad enough to cover the structure disclosed herein.

It will be understood that modification of various details might readily occur to persons skilled in the art and still fall within the spirit and scope of my invention. I do not desire, therefore, to be limited or restricted to the exact details shown and described.

But having now set forth the objects and nature of my invention, and a structure embodying the principles thereof, what I claim as new and useful and of my own invention, and desire to secure by Letters Patent is,—

1. In an automobile body structure, a body frame including longitudinally extending body sills, a tonneau panel connected at its lower edge to said body sills and provided with inwardly extending depressions in the side portions thereof to form wheel housings, in combination with reinforcing members connected to said body sills and having vertically extending portions to which the forward vertical edges of the tonneau panel are connected, said reinforcing members having portions inwardly depressed to conform to the wheel housing depressions of the tonneau panel.

2. In an automobile body structure, a body frame including longitudinally and transversely extending frame members, in combination with reinforcing members secured to said frame members, and having vertically extending portions, said vertically extending portions being depressed or curved inwardly, and a tonneau panel correspondingly depressed or curved and secured against the depressed or curved surface of said reinforcing members.

3. In an automobile body structure, a body frame including longitudinally extending body sills and transverse members connecting said body sills and a tonneau panel connected at its lower edge to said body sills, and provided with inwardly extending depressions in the side surfaces thereof to form wheel housings, in combination with reinforcing members having longitudinally extending portions connected to said body sills, transversely extending portions connected to a cross member of the frame, and vertically extending portions connected to the forward vertical edges of the tonneau panel, each reinforcing member being formed with an inwardly extending depressed surface, conforming to a wheel housing depression of the tonneau panel to which it is applied.

4. In an automobile body structure, a body frame including longitudinally and transversely extending frame members, in combination with reinforcing members, each having longitudinally, transversely and vertically extending portions, said longitudinally and transversely extending portions being secured to the frame members, and said vertically extending portions being depressed or curved inwardly, and a tonneau panel correspondingly depressed or curved and secured against the inwardly depressed portion of said reinforcing members.

5. In an automobile body structure, a sheet metal panel having longitudinally extending side portions and a back portion curved to form the sides and back of a seat, the forward vertical edges of said side portions being formed into channels, in combination with hinge members disposed in and extending across said channels and forming braces therefor.

6. In an automobile body structure, a body frame, reinforcing members secured to said frame and having vertically extending portions, and a tonneau panel having its forwardly extending side portions fitted against and secured to the exterior side surfaces of the vertically extending portions of said reinforcing members, and a cover plate applied over the inner side surfaces of said reinforcing members, and secured thereto and to the tonneau panel.

7. In an automobile body structure, a body frame, reinforcing members secured to said frame and having vertically extending portions, and a tonneau panel having its forwardly extending side portions fitted against and secured to the exterior side surfaces of the vertically extending portions of said reinforcing members, and reinforcing door opening strips applied to the forward edges of said reinforcing members.

8. In an automobile body structure, a sheet metal panel having longitudinally extending side portions and a back portion, curved to form the sides and back of a seat, the forward vertical edges of said side portions being formed into channels, in combination with hinge members disposed in said channels and connected to opposite walls thereof to form transverse braces and door hinge straps extending through the walls of said channels and pivotally connected to said hinge members.

9. In an automobile body structure, a sheet metal panel having its vertical edge portion bent outwardly and then extended forwardly and finally flanged inwardly, in combination with reinforcing braces or struts interposed between and secured respectively to said outwardly bent and inwardly flanged portions, said struts or braces carrying hinge pins, and a door having hinge straps to engage said pins.

10. In an automobile body structure, a sheet metal panel having its vertical edge portion bent outwardly and then extended forwardly and finally flanged inwardly, in combination with reinforcing braces or struts interposed between and secured respectively to said outwardly bent and inwardly flanged portions, said struts or braces carrying hinge pins, the outwardly bent portions of said panels having openings therethrough, a door, and hinge straps secured thereto, said straps having angle portions working through said openings and engaging said pins.

11. In an automobile body structure, a sheet metal panel having its vertical edge portion bent outwardly and then extended forwardly and finally flanged inwardly to form an open sided chamber, struts or braces having feet respectively fitting against and secured to the opposed surfaces of said outwardly bent and inwardly flanged portions, said struts or braces carrying hinge pins, and a door having hinge straps arranged to extend through openings in the outwardly bent portions of the panel and engaging said pins.

12. In an automobile body structure, a frame member, a standard secured at its base to said frame member, a panel having a vertical edge flanged, said flange and standard being secured together, and a door having a hinge strap, said standard carrying a hinge pin to be engaged by said hinge strap.

13. In an automobile body structure, a frame member, a standard secured at its base to said frame member, a panel having an inturned flange at its vertical edge, the vertical portion of said standard fitting against and secured to said flange, and carrying a hinge pin, a door, and a hinge strap secured thereto, said strap extending through said flange and engaging said hinge pin.

14. In an automobile body, a cowl panel having an inturned flange at its rear vertical edge forming a vertical reinforcing channel, a standard extending upwardly into said channel and secured to said flange, said standard carrying a hinge pivot, and a door having a hinge strap to engage said hinge pivot.

15. In an automobile body structure, a cowl panel, in combination with a reinforcing bracket secured at its ends respectively to the forward and rear edges of said panel, a hinge pin carried by said bracket, and a door having a hinge strap arranged to engage said hinge pin.

16. In an automobile body structure, a cowl panel, in combination with a reinforcing bracket secured at its ends respectively to the forward and rear edges of said panel, a hinge pin carried by said bracket, a door having a hinge strap arranged to engage said hinge pin and a windshield support carried by said bracket.

17. In an automobile body structure, a combined windshield and hinge supporting bracket, a cowl panel to which said bracket is connected, a windshield support carried by said bracket, and a door having a hinge strap pivoted upon said bracket.

18. In an automobile body structure, a cowl panel, a reinforcing bracket having feet at the respective ends thereof, said feet fitting against and secured to members at the front and rear vertical edges of said panel and forming a brace therefor, a windshield support carried by said bracket, and a door having a hinge strap pivotally connected to said bracket.

In testimony whereof I have hereunto set my hand on this 12th day of January, A. D. 1920.

JOSEPH LEDWINKA.